US012112549B2

United States Patent
Chun et al.

(10) Patent No.: US 12,112,549 B2
(45) Date of Patent: Oct. 8, 2024

(54) METHOD FOR DETECTING TRAFFIC SIGN USING LIDAR SENSOR AND TRAFFIC SIGN DETECTION DEVICE PERFORMING THE METHOD

(71) Applicant: Vueron Technology Co., Ltd, Seoul (KR)

(72) Inventors: Changhwan Chun, Seoul (KR); Seungyong Lee, Goyang-si (KR)

(73) Assignee: Vueron Technology Co., Ltd, Seoul (KR)

( * ) Notice: Subject to any disclaimer, the term of this patent is extended or adjusted under 35 U.S.C. 154(b) by 549 days.

(21) Appl. No.: 17/462,377

(22) Filed: Aug. 31, 2021

(65) Prior Publication Data
US 2023/0069691 A1 Mar. 2, 2023

(30) Foreign Application Priority Data
Aug. 30, 2021 (KR) .................. 10-2021-0115122

(51) Int. Cl.
*G06K 9/00* (2022.01)
*G01S 7/48* (2006.01)
*G01S 17/931* (2020.01)
*G06F 18/23* (2023.01)
*G06V 20/58* (2022.01)

(52) U.S. Cl.
CPC .......... *G06V 20/582* (2022.01); *G01S 7/4802* (2013.01); *G01S 17/931* (2020.01); *G06F 18/23* (2023.01)

(58) Field of Classification Search
CPC .. G06V 20/582; G06V 10/762; G01S 7/4802; G01S 17/931; G01S 17/89; G06F 18/23
See application file for complete search history.

(56) References Cited

U.S. PATENT DOCUMENTS

| | | | |
|---|---|---|---|
| 2018/0307924 A1* | 10/2018 | Zeng | G06V 10/46 |
| 2020/0401823 A1* | 12/2020 | Miller | G01C 21/3811 |
| 2021/0342620 A1* | 11/2021 | Miura | G06V 20/582 |
| 2021/0358153 A1* | 11/2021 | Cai | G06V 10/247 |
| 2022/0092320 A1* | 3/2022 | Brouns | G06F 18/23 |

FOREIGN PATENT DOCUMENTS

| | | |
|---|---|---|
| JP | 6787389 B2 | 11/2020 |
| KR | 1020190043035 A | 4/2019 |
| KR | 1020190078890 A | 7/2019 |

OTHER PUBLICATIONS

Zhang, Ximin, Wanggen Wan, and Xuandong An. "Clustering and DCT based color point cloud compression." Journal of Signal Processing Systems 86 (2017): 41-49. (Year: 2017).*

* cited by examiner

*Primary Examiner* — Andrew M Moyer
(74) *Attorney, Agent, or Firm* — Bridgeway IP Law Group, PLLC; Jihun Kim (57) ABSTRACT

A method for detecting a traffic sign using a traffic sign detection device is provided. The method includes acquiring point data from a lidar sensor detecting a vicinity of the lidar sensor; clustering a plurality of points based on positions of the plurality of points included in the point data; determining one or more plane object clusters, each of which corresponds to a plane object, among one or more clusters, each of which is formed by clustering the plurality of points; and detecting one or more traffic sign object clusters, each of which corresponds to the traffic sign, among the one or more plane object clusters based on a predetermined traffic sign detection factor.

16 Claims, 9 Drawing Sheets

METHOD FOR DETECTING TRAFFIC SIGN USING LIDAR SENSOR AND TRAFFIC SIGN DETECTION DEVICE PERFORMING THE METHOD

CROSS-REFERENCE TO RELATED APPLICATION

This application claims priority to Korean Patent Application No. 10-2021-0115122, filed on Aug. 30, 2021. The entire contents of the application on which the priority is based are incorporated herein by reference.

TECHNICAL FIELD

The present disclosure relates to a method for detecting a traffic sign by using a lidar sensor and a traffic sign detection device performing the method.

BACKGROUND

Light detection and ranging (Lidar) is a method for acquiring information on ranges (variable distance) by measuring the time for a reflected laser beam from a target object to return to the receiver using a high-power pulsed laser. Lidar is used in various field such as autonomous vehicles, an observation of global environment, an analysis of atmosphere and unmanned devices. Recently, the importance and the utilization of the LiDAR are being increased as it is utilized as a core technology of a 3D reverse engineering, a laser scanner for autonomous/unmanned vehicles and a 3D video camera.

<Importance of the Traffic Sign Detection Technology in Autonomous Driving Technology>

Meanwhile, it is required to accurately recognize the position of the vehicle (vehicle localization) for autonomous driving. While the position of the vehicle is being recognized by a GPS sensor, since the position of the vehicle should be distinguished within a few centimeters of error range for autonomous driving, the position of the vehicle is required to detect more accurately.

In general, in order to estimate an accurate position, a map matching method is used by which the position of the vehicle is matched with a high definition map (an HD map for autonomous driving) including various information. The high definition map may include information for estimating a lateral position of the vehicle and information for estimating a longitudinal position of the vehicle.

There are various information for estimating the lateral position of the vehicle (e.g., a wall, a guardrail, a lane line, etc., and these information are observed continuously around the vehicle during driving. However, types of the information for estimating the longitudinal position of the vehicle (e.g., traffic sign, traffic light, etc.) are few, and they are observed intermittently, not continuously.

Accordingly, in this restricted situation, it is very important to accurately detect the longitudinal position of the vehicle (e.g., a longitudinal distance), and the result of the detection may help to increase the performance of the estimation result of the longitudinal position for the precision positioning technique.

<Problem of the Traffic Sign Detection Technology Using Other Sensors>

Conventionally, a camera sensor is used to detect the longitudinal position of the vehicle. However, in case of using the camera sensor, it is difficult to accurately detect the distance between the vehicle and the traffic sign or between the vehicle and the traffic light. Further, the performance is drastically decreased in unusual situations such as a considerable change of illuminance, a night driving and a driving in the rain.

SUMMARY

In view of the above, the present disclosure provides a method for detecting a traffic sign on a road by using a lidar sensor.

Technical objects to be achieved by the present disclosure are not limited to those described above, and other technical objects not mentioned above may also be clearly understood from the descriptions given below by those skilled in the art to which the present disclosure belongs.

In accordance with an aspect of the present disclosure, there is provided a method for detecting a traffic sign by using a traffic sign detection device, the method including: acquiring point data from a lidar sensor by detecting a vicinity of the lidar sensor: clustering a plurality of points based on positions of the plurality of points included in the point data: determining one or more plane object clusters, each of which corresponds to a plane object, among one or more clusters, each of which is formed by clustering the plurality of points; and detecting one or more traffic sign object clusters, each of which corresponds to the traffic sign, among the one or more plane object clusters based on a predetermined traffic sign detection factor.

Further, the clustering of the plurality of points may include distinguishing traffic sign candidate points having heights equal to or greater than a predetermined first reference height among the plurality of points, and clustering the traffic sign candidate points based on positions of the traffic sign candidate points.

Further, the clustering of the traffic sign candidate points may include connecting, among the traffic sign candidate points, traffic sign candidate points having a distance therebetween that is equal to or smaller than a predetermined first reference distance, and clustering the traffic sign candidate points such that the connected traffic sign candidate points are included in one cluster.

Further, the determining of the one or more plane object clusters may include generating one or more straight lines each connecting at least one pair of points included in a first cluster of the one or more clusters, and determining whether the first cluster belongs to the one or more plane object clusters by using inlier points for each of the one or more straight lines.

Further, the determining of whether the first cluster belongs to the one or more plane object clusters may include selecting a representative straight line having the most inlier points from among the one or more straight lines, and determining that the first cluster belongs to the one or more plane object clusters when a ratio of the number of inlier points for the representative straight line to the number of points included in the first cluster is equal to or greater than a predetermined reference ratio.

Further, the predetermined traffic sign detection factor may include at least one of a reference angle, a reference size, or a second reference height.

Further, the detecting of the one or more traffic sign object clusters may include, in case that the predetermined traffic sign detection factor includes the reference angle, determining whether an angle difference between a normal vector of the plane object indicated by each of the one or more plane object clusters and a moving direction of a vehicle having the traffic sign detection device is equal to or smaller than the reference angle.

Further, the detecting of the one or more traffic sign object clusters may include, in case that the predetermined traffic sign detection factor includes the reference size, determining whether a size of the plane object indicated by each of the one or more plane object cluster is equal to or greater than the reference size.

Further, the detecting of the one or more traffic sign object clusters may include, in case that the predetermined traffic sign detection factor includes the second reference height, determining that a height of the plane object indicated by each of the one or more plane object clusters from a ground surface is equal to or greater than the second reference height.

Further, the predetermined traffic sign detection factor may include at least one of a reference size or a second reference height, and the detecting of the one or more traffic sign object clusters may include: dividing each of the one or more plane object clusters into a plurality of areas according to predetermined intervals: selecting one or more traffic sign detecting areas among the plurality of areas based on a horizontal distance between a first point having a largest horizontal position value and a second point having a smallest horizontal position value among points included in each of the plurality of areas; and determining whether the corresponding plane object cluster satisfies at least one of the reference size or the second reference height included in the predetermined traffic sign detection factor by using positions of points included in the selected one or more traffic sign detecting areas.

Further, in case that the predetermined traffic sign detection factor includes the reference size, the determining of whether the corresponding plane object cluster satisfies at least one of the reference size or the second reference height may include: determining a third point having the smallest horizontal position value, a fourth point having the largest horizontal position value, a fifth point having the smallest vertical position value and a sixth point having the largest vertical position value among the points included in the selected one or more traffic sign detecting areas; and determining whether the corresponding plane object cluster satisfies the reference size based on a difference between the horizontal position value of the third point and the horizontal position value of the fourth point and a difference between the vertical position value of the fifth point and the vertical position value of the sixth point.

Further, in case that the predetermined traffic sign detection factor includes the second reference height, the determining of whether the corresponding plane object cluster satisfies at least one of the reference size or the second reference height may include: determining a seventh point having the smallest vertical position value among the points included in the selected one or more traffic sign detecting areas; and determining whether the corresponding plane object cluster satisfies the second reference height based on the vertical position value of the seventh point.

Further, the acquiring of the point data, the clustering of the plurality of points, the determining of the one or more plane object clusters, and the detecting of the one or more traffic sign object clusters may be performed frame by frame, and the method further may include, based on at least one comparison result of a size and a position of a first traffic sign object indicated by a first traffic sign object cluster detected in a present frame and a size and a position of a second traffic sign object indicated by a second traffic sign object cluster detected in a previous frame, determining an identity of the first traffic sign object and the second traffic sign object.

In accordance with another aspect of the present disclosure, there is provided a traffic sign detection device including: a transceiver configured to acquire point data by detecting a vicinity of a lidar sensor; and a processor configured to control the transceiver. Further, the processor is configured to cluster a plurality of points based on positions of the plurality of points included in the point data, determine one or more plane object clusters, each of which corresponds to a plane object, among one or more clusters, each of which is formed by clustering the plurality of points, and detect one or more traffic sign object clusters, each of which corresponds to the traffic sign, among the one or more plane object clusters based on a predetermined traffic sign detection factor.

In accordance with still another aspect of the present disclosure, there is provided a traffic sign detection system including: a lidar sensor configured to acquire point data by detecting a vicinity of the lidar sensor; and a traffic sign detection device configured to acquire a traffic sign. The traffic sign detection device includes a transceiver configured to acquire the point data detected by the lidar sensor; and a processor configured to control the transceiver. Further, the processor is configured to cluster a plurality of points based on positions of the plurality of points included in the point data, determine one or more plane object clusters, each of which corresponds to a plane object, among one or more clusters, each of which is formed by clustering the plurality of points, and detect one or more traffic sign object clusters, each of which corresponds to the traffic sign, among the one or more plane object clusters based on a predetermined traffic sign detection factor.

In accordance with still another aspect of the present disclosure, there is provided a non-transitory computer-readable storage medium storing computer-executable instructions which cause, when executed by a processor, the processor to perform a method for detecting a traffic sign using a traffic sign detection device, the method including: acquiring point data from a lidar sensor detecting a vicinity of the lidar sensor: clustering a plurality of points based on positions of the plurality of points included in the point data: determining one or more plane object clusters, each of which corresponds to a plane object, among one or more clusters, each of which is formed by clustering the plurality of points; and detecting one or more traffic sign object clusters, each of which corresponds to the traffic sign, among the one or more plane object clusters based on a predetermined traffic sign detection factor.

According to the aspects of the present disclosure, by detecting the traffic sign using the lidar sensor, it is possible to detect traffic sign on a road despite the changes of the environment such as a considerable change of illuminance, a night or raining situation, and the like.

Further, according to the aspects of the present disclosure, by accurately providing the longitudinal distance between the traffic sign and the vehicle, it is possible to precisely estimate the position of the vehicle.

Furthermore, according to the aspects of the present disclosure, by measuring the actual distance between the vehicle and the traffic sign using the lidar sensor, it is possible to accurately measure the 3D position of the traffic sign.

DETAILED DESCRIPTION

The advantages and features of exemplary embodiments of the present disclosure and methods of accomplishing them will be clearly understood from the following description of the embodiments taken in conjunction with the accompanying drawings. However, the present disclosure is not limited to those embodiments and is implemented in various forms. It is noted that the embodiments are provided to make a full disclosure and also to allow those skilled in the art to know the full scope of the present disclosure.

In the following description, well-known functions and/or configurations will not be described in detail if they would unnecessarily obscure the features of the disclosure. Further, the terms to be described below are defined in consideration of their functions in the embodiments of the disclosure and vary depending on a user's or operator's intention or practice. Accordingly, the definition is made on a basis of the content throughout the present disclosure.

Figure 1:
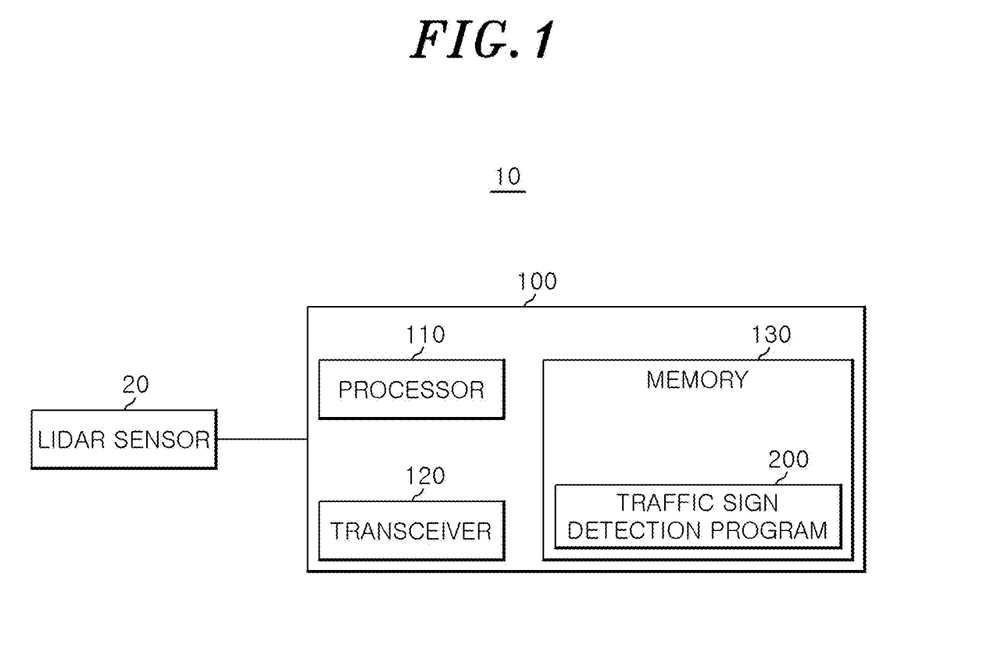
FIG. 1 is a block diagram illustrating a traffic sign detection system according to an embodiment of the present disclosure.

FIG. 1 is a block diagram illustrating an example of a traffic sign detection system according to an embodiment of the present disclosure.

Referring to FIG. 1, the traffic sign detection system 10 may include a lidar sensor 20 and a traffic sign detection device 100.

In the present disclosure, for the sake of convenience of description, a case where the traffic sign detection system 10 is installed in an autonomous vehicle (hereinafter simply referred to as a vehicle) is mainly described. However, the present disclosure is not limited thereto. For example, the traffic sign detection system 10 may be installed in an unmanned moving object such as a drone or other moving objects such as a vehicle, a motorcycle, a flight vehicle, and the like as well as the autonomous vehicle.

In addition, in the present disclosure, a case where the lidar sensor 20 is provided separately from the traffic sign detection device 100 to transmit point data to the traffic sign detection device 100 is mainly described. However, the present disclosure is not limited thereto. For example, the traffic sign detection device 100 may include the lidar sensor 20. In this case, the lidar sensor 20 may transmit the point data to a point data receiving unit 210 which will be described later through internal signaling.

The lidar sensor 20 may emit a laser beam in a predetermined direction, for example, in all direction (360 degrees) including not only a direction in which the traffic sign detection device moves (forward direction) but also lateral and backward directions of the traffic sign detection device. The lidar sensor 20 may receive a reflected (or backscattered) laser beam from surrounding terrain and the like. Here, the laser beam emitted and received by the lidar sensor 20 may include at least one point data.

The traffic sign detection device 100 may receive point data from the lidar sensor 20 and detect a traffic sign around the traffic sign detection device 100 (or the vehicle with the traffic sign detection device 100) using the received point data.

Specifically, the traffic sign detection device 100 may cluster the received point data, detect a plane cluster using the clustered point data, detect a traffic sign in the detected plane cluster, and determine the identity of a detected traffic sign in a present frame and a detected traffic sign in a previous frame.

In this connection, the traffic sign detection device 100 may include a processor 110, a transceiver 120, and a memory 130.

The processor 110 may control the overall operation of the traffic sign detection device 100.

The processor 110 may receive the point data from the lidar sensor 20 through the transceiver 120.

In the present disclosure, a case where the traffic sign detection device 100 receives the point data through the transceiver 120 is mainly described. However, the present disclosure is not limited thereto and, for example, the traffic sign detection device 100 may include an input/output device (not shown) and receive the point data through the input/output device. Alternatively, for example, the traffic sign detection device 100 may include the lidar sensor 20 to generate the point data in the traffic sign detection device 100.

The memory 130 may store a traffic sign detection program 200 and information necessary to execute the traffic sign detection program 200.

In the present disclosure, the traffic sign detection program 200 may be software including instructions that are programmed to detect the traffic sign on a road using information of the point data.

The processor 110 may load the traffic sign detection program 200 and the information necessary to execute the traffic sign detection program 200 from the memory 130.

Further, the processor 110 may execute the traffic sign detection program 200 to detect the traffic sign positioned around the traffic sign detection device 100.

Functions and/or an operation of the traffic sign detection program 200 will be described in detail with reference to FIG. 2.

Figure 2:
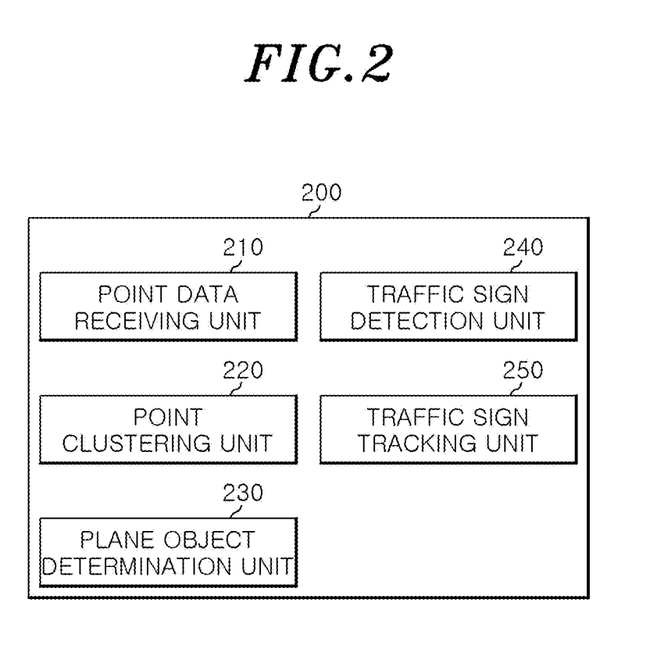
FIG. 2 is a block diagram conceptually illustrating functions of a traffic sign detection program according to an embodiment of the present disclosure.

FIG. 2 is a block diagram conceptually illustrating functions of the traffic sign detection program 200 according to the embodiment of the present disclosure.

Referring to FIG. 2, the ground detection program 200 may include a point data receiving unit 210, a point clustering unit 220, a plane object determination unit 230, a traffic sign detection unit 240, a traffic sign tracking unit 250.

In FIG. 2, the traffic sign detection program 200 is conceptually divided into the point data receiving unit 210, the point clustering unit 220, the plane object determination unit 230, the traffic sign detection unit 240, and the traffic sign tracking unit 250 in order to easily explain the functions of the traffic sign detection program 200. However, the present disclosure is not limited thereto. For example, the functions of the point data receiving unit 210, the point clustering unit 220, the plane object determination unit 230, the traffic sign detection unit 240, and the traffic sign tracking unit may be integrated or separated, and may be implemented as a series of instructions included in one program.

The point data receiving unit 210 may receive the point data from the lidar sensor 20. The point data received by the point data receiving unit 210 may include a plurality of points.

The point clustering unit 220 may cluster the plurality of points included in the received point data.

Specifically, the point clustering unit 220 first distinguish traffic sign candidate points among the plurality of points using the height of each of the plurality of points. This is because the traffic sign on the road is generally positioned higher than the vehicle.

Accordingly, the point clustering unit 220 may distinguish the points having heights equal to or greater than a predetermined first reference height as the traffic sign candidate points among the plurality of points. For example, the first reference height may be set based on the height of the vehicle (e.g., the maximum height for the same type of the vehicle).

Figure 3:
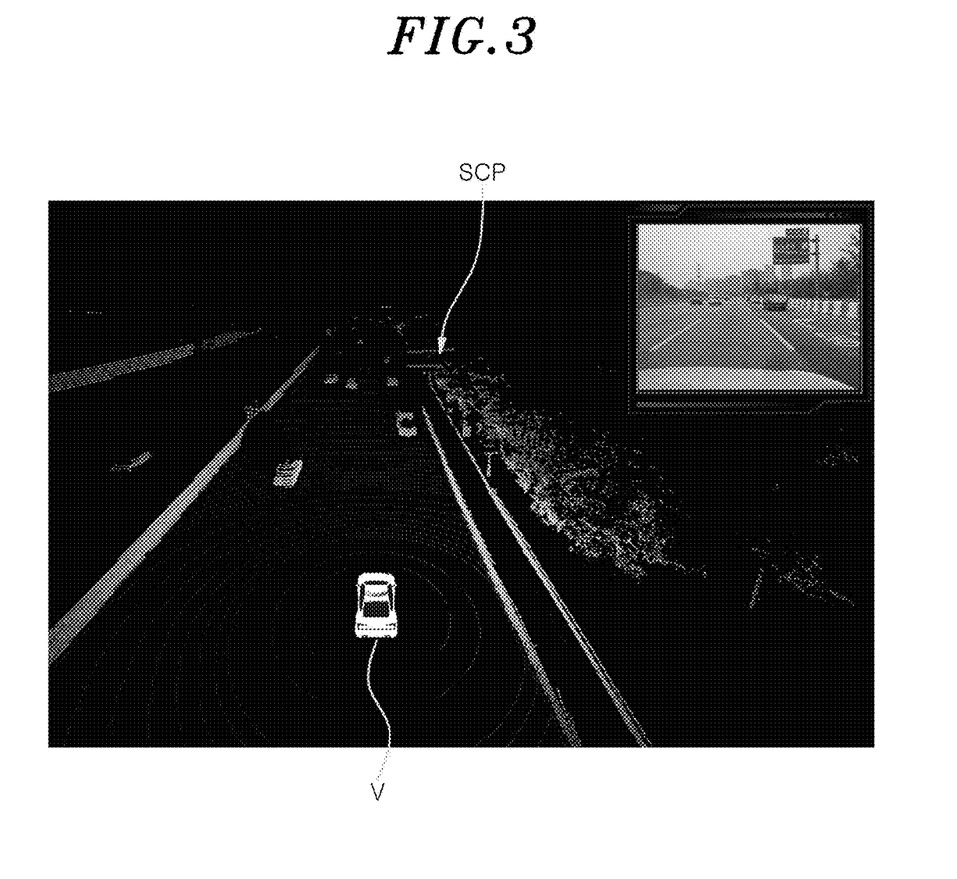
FIG. 3 is an example of a result of distinguishing a traffic sign candidate point by using a point clustering unit according to the embodiment of the present disclosure.

For example, FIG. 3 illustrates an example of a result of distinguishing the traffic sign candidate points by the point clustering unit 220 according to the embodiment of the present disclosure.

Referring to FIG. 3, the point clustering unit 220 may indicate the traffic sign candidate points SCP having the height of equal to or greater than the first reference height to be distinguished from the other points using tools such as colors among a plurality of points positioned in a moving direction of the vehicle V.

Further, the point clustering unit 220 may perform clustering of the traffic sign candidate points using position information of each traffic sign candidate point. Here, the position information may indicate a position of the traffic sign candidate point in a 3D space (e.g., a position on a map for autonomous driving or an absolute position on the earth).

More specifically, the point clustering unit 220 may calculate a distance between two traffic sign candidate points (e.g., a distance in a 3D space) using position information of each traffic sign candidate point, connect traffic sign candidate points having a distance therebetween that is equal to or smaller than a predetermined first reference distance, and generate at least one cluster such that connected traffic sign candidate points are included in one cluster.

For example, among a plurality of traffic sign candidate points, in case that a distance between a first traffic sign candidate point and a second traffic sign candidate point is equal to or smaller than a first reference distance, a distance between the second traffic sign candidate point and a third traffic sign candidate point is equal to or smaller than a first reference distance, and a distance between a fourth traffic sign candidate point and a fifth traffic sign candidate point is equal to or smaller than a first reference distance, the point clustering unit 220 may generate a first cluster including the first traffic sign candidate point, the second traffic sign candidate point and the third traffic sign candidate point, and a second cluster including the fourth traffic sign candidate point and the fifth traffic sign candidate point.

Figure 4:
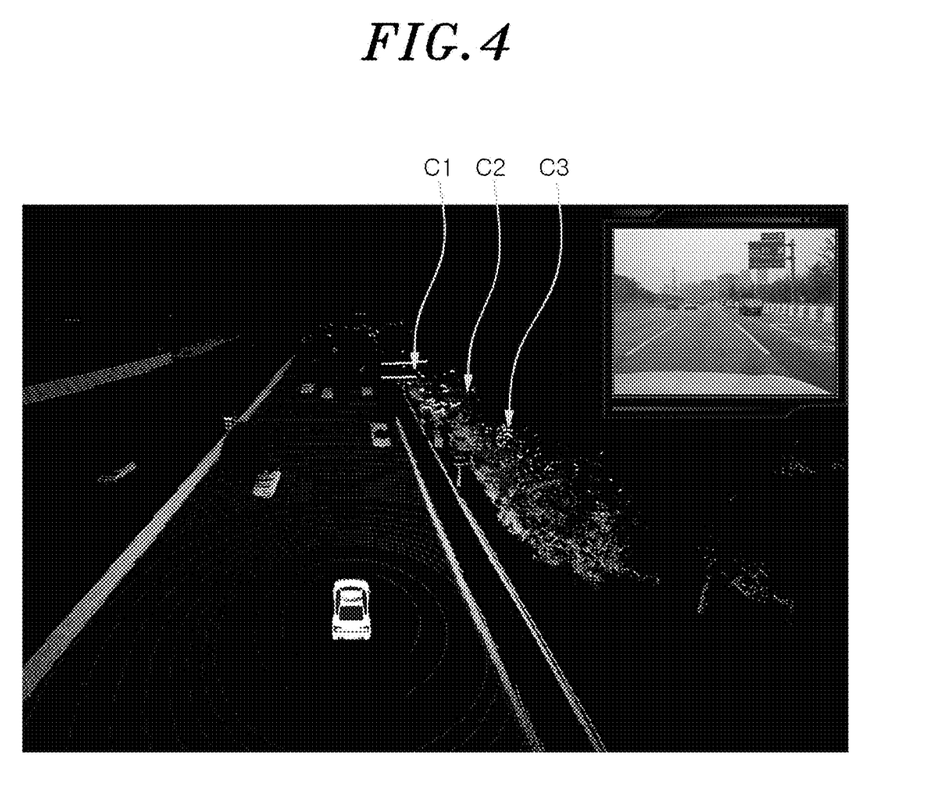
FIG. 4 is an example of a result of clustering traffic sign candidate points by a point clustering unit according to the embodiment of the present disclosure.

For example, FIG. 4 illustrates an example of a result of clustering the traffic sign candidate points by the point clustering unit 220 according to the embodiment of the present disclosure.

Referring to FIG. 4, the point clustering unit 220 may generate a plurality of clusters (C1, C2, C3, . . . ) each of which is generated by connecting traffic sign candidate points having a distance between two traffic sign candidate points that is equal to or smaller than the first reference distance. Further, the plurality of clusters (C1, C2, C3, . . . ) may be distinguished from each other using tools such as colors.

Then, the plane object determination unit 230 may generate at least one straight line using points included in the at least one cluster generated by the point clustering unit 220, and determine planeness of the at least one cluster using inlier points for the at least one straight line.

More specifically, the plane object determination unit 230 may project a plurality of points included in the at least one cluster onto a 2D plane, and generate one straight line for a line fitting of the plurality of points.

That is, the plane object determination unit 230 may select a pair of points in random among the plurality of points projected onto the 2D plane, and generate a straight line by connecting the selected pair of points.

The plane object determination unit 230 may calculate a distance between the generated straight line and each point included in the same cluster with the selected pair of points, and determine inlier points having a calculated distance equal to or smaller than a predetermined second reference distance from the plurality of points.

The plane object determination unit 230 may select different pairs of points several times (e.g., number of times for selecting two points among the plurality of points), and determine inlier points of a straight line for the selected pair of points.

The plane object determination unit 230 may select a straight line having the most inlier points among lines connecting a pair of points as a representative straight line in the corresponding cluster.

Figure 5:
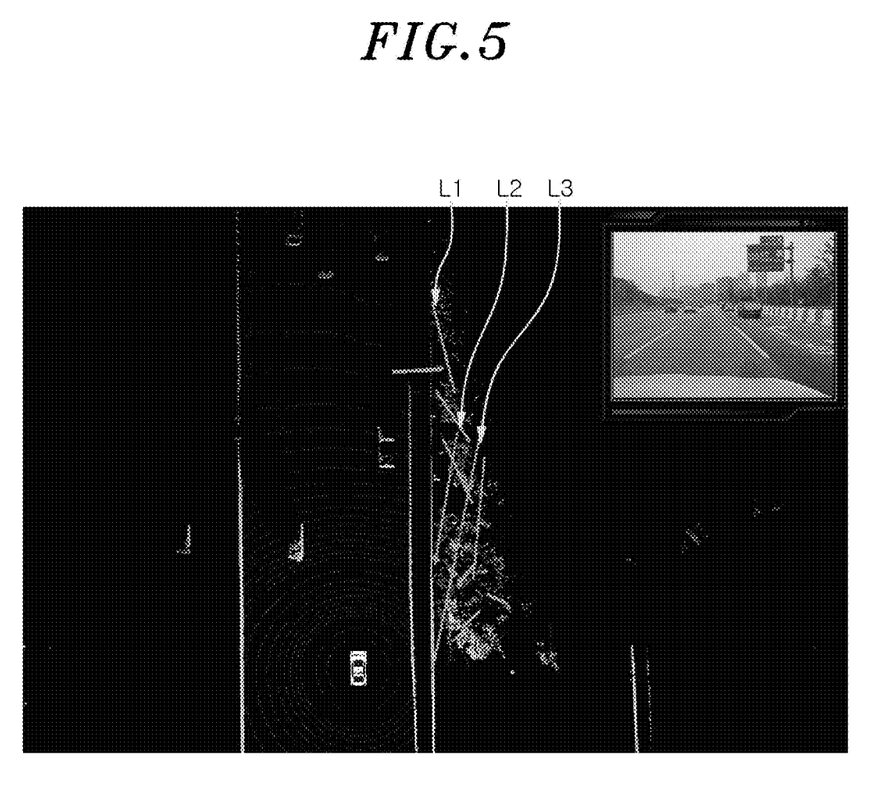
FIG. 5 is an example of a result of selecting representative straight lines in a cluster by a plane object determination unit according to the embodiment of the present disclosure.

For example, FIG. 5 illustrates an example of a result of selecting a representative straight line in a cluster by the plane object determination unit 230 according to the embodiment of the present disclosure.

Referring to FIG. 5, the plane object determination unit 230 may select a representative straight line for each cluster, and indicate selected representative straight lines (L1, L2, L3, . . . ).

The plane object determination unit 230 may compare the number of inlier points for the representative straight lines with the number of entire points included in the corresponding cluster, and determine that the object indicated by the corresponding cluster has planeness (i.e., a plane object).

According to the embodiment of the present disclosure, in case that the ratio of the number of inlier points for the representative straight lines to the number of entire points included in the cluster is equal to or greater than a predetermined reference ratio, the plane object determination unit 230 may determine the object indicated by the corresponding cluster is a plane object.

Figure 6:
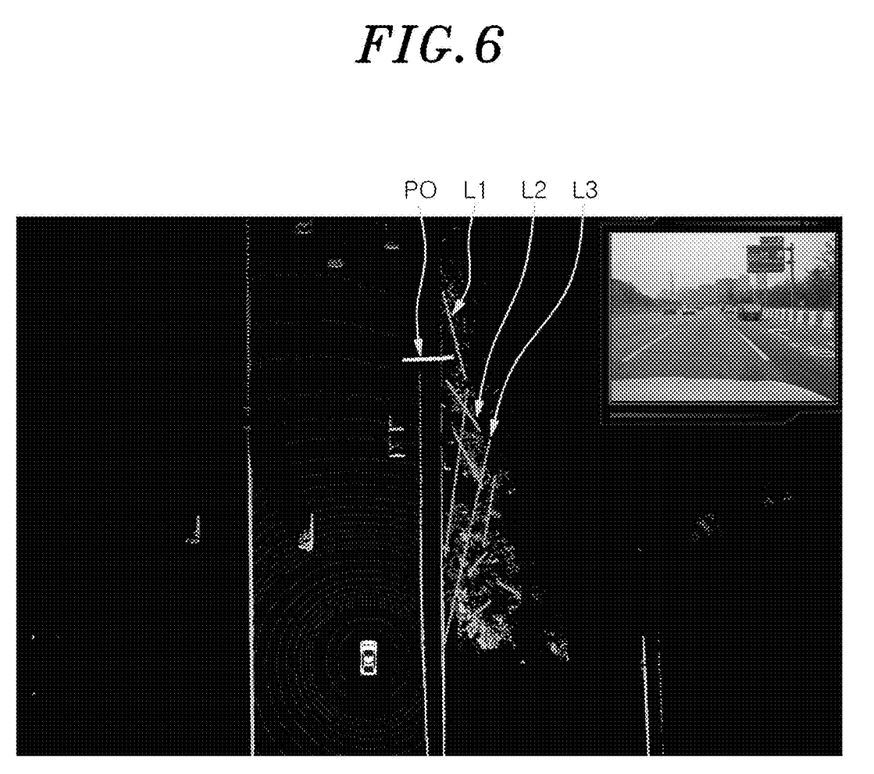
FIG. 6 is an example of a result of determining the plane object by a plane object determination unit according to the embodiment of the present disclosure.

For example, FIG. 6 illustrates an example of a result of determining a plane object by the plane object determination unit 230 according to the embodiment of the present disclosure.

Referring to FIG. 6, the plane object determination unit 230 may determine a plane object PO based on the ratio of the number of inlier points for the representative straight lines of the cluster to the number of entire points included in the cluster, and indicate the plane object PO to be distinguished from the other representative straight lines (L1, L2, L3, . . . ) using tools such as colors.

Then, the traffic sign detection unit 240 may detect a traffic sign object corresponding to a traffic sign from at least one plane object based on at least one of a predetermined reference angle, a predetermined reference size, or a predetermined second reference height.

For example, the traffic sign detection unit 240 may determine a plane object satisfying the reference angle and the reference size as the traffic sign object from at least one plane object, or determine a plane object satisfying all of the reference angle, the reference size and the second reference height as the traffic sign object from at least one plane object.

The method for determining whether the reference angle is satisfied will be described first. The traffic sign is generally installed to face the moving vehicle, and the each of the at least one plane object may be indicated as a plane using a pre-projected 2D plane.

Accordingly, in order to determine whether the at least one plane object satisfies the reference angle, the traffic sign detection unit 240 may determine whether an angle difference of a normal vector of the plane object and a moving direction of the vehicle is equal to or smaller than the reference angle. For example, the reference angle may be 20°.

The traffic sign detection unit 240 may determine that a plane object having the angle difference of the normal vector and the moving direction of the vehicle greater than the reference angle is not the traffic sign object.

The method for determining whether the reference size and/or the second reference height are/is satisfied will be described next. The traffic sign detection unit 240 may determine that a plane object that does not satisfy the reference size and the second reference height is not the traffic sign object. According to the embodiment of the present disclosure, the reference size includes a vertical length and a horizontal length of the plane object, and the second reference height may indicate a height of a bottom side of the plane object.

In this connection, the traffic sign detection unit 240 may determine the size and the height of the plane object using positions of the points included in the plane object, compare the size of the plane object with the reference size, and compare the height of the plane object with the second reference height.

More specifically, in order to determine the size (i.e., the vertical length and the horizontal length) and the height of the plane object, the traffic sign detection unit 240 may divide the plane object (or a predetermined area including the plane object) into a plurality of areas according to a predetermined height pitch, and classify the points into one area among the plurality of areas according to each of positions of the points included in the plane object.

The traffic sign detection unit 240 may detect areas in which a maximum distance between the points in a horizontal direction (i.e., lateral direction) is equal to or longer than a third reference distance among the plurality of areas. That is, the traffic sign detection unit 240 may calculate a lateral distance between the leftmost point and the rightmost point among the included points, and detect the area in which the calculated lateral distance is equal to or longer than the third reference distance.

The traffic sign detection unit 240 may determine a first point located at the leftmost position (i.e., a point having the smallest position value in the horizontal direction), a second point located at the rightmost position (i.e., a point having the largest position value in the horizontal direction), a third point position located at the lowermost position (i.e., a point having the smallest position value in the vertical direction), and a fourth point located at the uppermost position (i.e., a point having the largest position value in the vertical direction) using positions of the points included in detected areas.

The traffic sign detection unit 240 may determine the size and the height of the plane object using the position of the first point, the position of the second point, the position of the third point, and the position of the fourth point. That is, the traffic sign detection unit 240 may determine the difference between the horizontal position value of the first point and the horizontal position value of the second point as the horizontal length of the plane object, determine the difference between the vertical position value of the fourth point and the vertical position value of the third point as the vertical length of the plane object, and determine the vertical position value of the third point as the height of the plane object.

Figure 7:
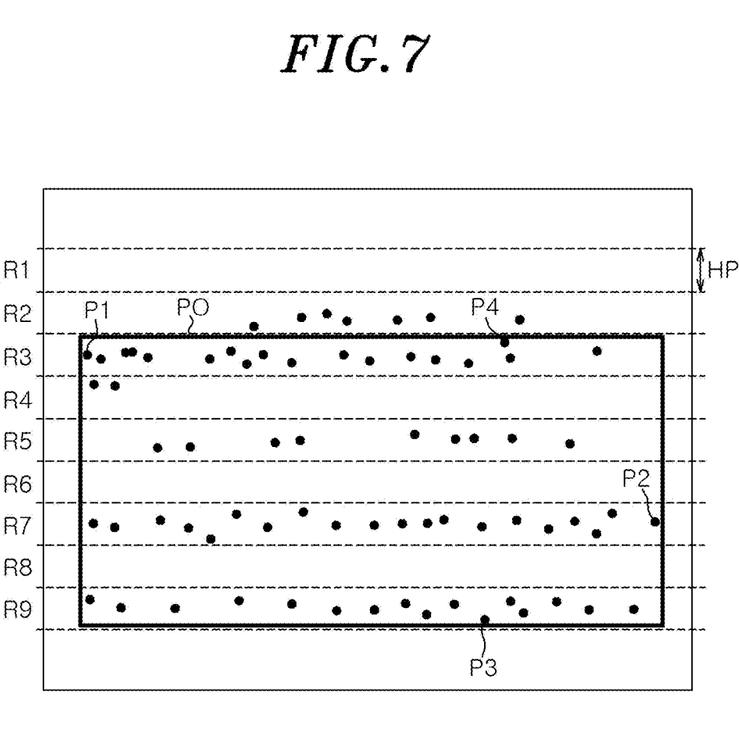
FIG. 7 illustrates a method for determining a size and a height of the plane object by a traffic sign detection unit.

For example, FIG. 7 illustrates a method for determining the size and the height of the plane object by the traffic sign detection unit 240.

Referring to FIG. 7, the traffic sign detection unit 240 may divide the plane object PO into a plurality of areas R1, R2, R3, R4, R5, R6, R7, R8 and R9 according to a predetermined height pitch HP, and classify each point included in the plane object PO into one area among the plurality of area R1, R2, R3, R4, R5, R6, R7, R8 and R9.

The traffic sign detection unit 240 may detect the third area R3, the seventh area R7 and the ninth area R9 in which the maximum horizontal distance between the included points is equal to or longer than the third reference distance among the plurality of area R1, R2, R3, R4, R5, R6, R7, R8 and R9.

By using the positions of the points included in the third area R3, the seventh area R7 and the ninth area R9, the traffic sign detection unit 240 may determine a first point P1 located at the leftmost point, a second point P2 located at the rightmost position, a third point P3 located at the lowermost position, a fourth point P4 located at the uppermost position, among the points included in the third area R3, the seventh area R7 and the ninth area R9. Further, the traffic sign detection unit 240 may determine the difference between the horizontal position value of the second point P2 and the horizontal position value of the first point P1 as the horizontal length of the plane object PO, determine the difference between the vertical position value of the fourth point P4 and the vertical position value of the third point P3 as the vertical length of the plane object PO, and determine the difference between the vertical position value of the third point P3 and the vertical position value of a ground surface as the height of the plane object PO.

The traffic sign detection unit 240 may determine whether the determined size of the plane object satisfies the reference size, and determine the determined height of the plane object satisfies the second reference height.

Further, in general, the size and the position of the traffic sign may be determined by a standard decided at a region in which the vehicle is being driven.

Accordingly, the traffic sign detection unit 240 may determine whether the size and the position of the plane object indicated by the 2D plane satisfy the reference size and the second reference height decided by the standard.

For example, in Republic of Korea, the horizontal length of the traffic sign is required to be equal to or longer than 360 cm, and the vertical length of the traffic sign is required to be equal to or longer than 220 cm in two-lane expressways, and the horizontal length of the traffic sign is required to be equal to or longer than 400 cm, and the vertical length of the traffic sign is required to be equal to or longer than 250 cm in four-lane expressways. Therefore, in case that the vehicle is being driven in Republic of Korea, the traffic sign detection unit 240 may determine whether the horizontal length of the plane object is smaller than 5 meters and the vertical length of the plane object is smaller than 3 meters according to the standard.

Figure 8:
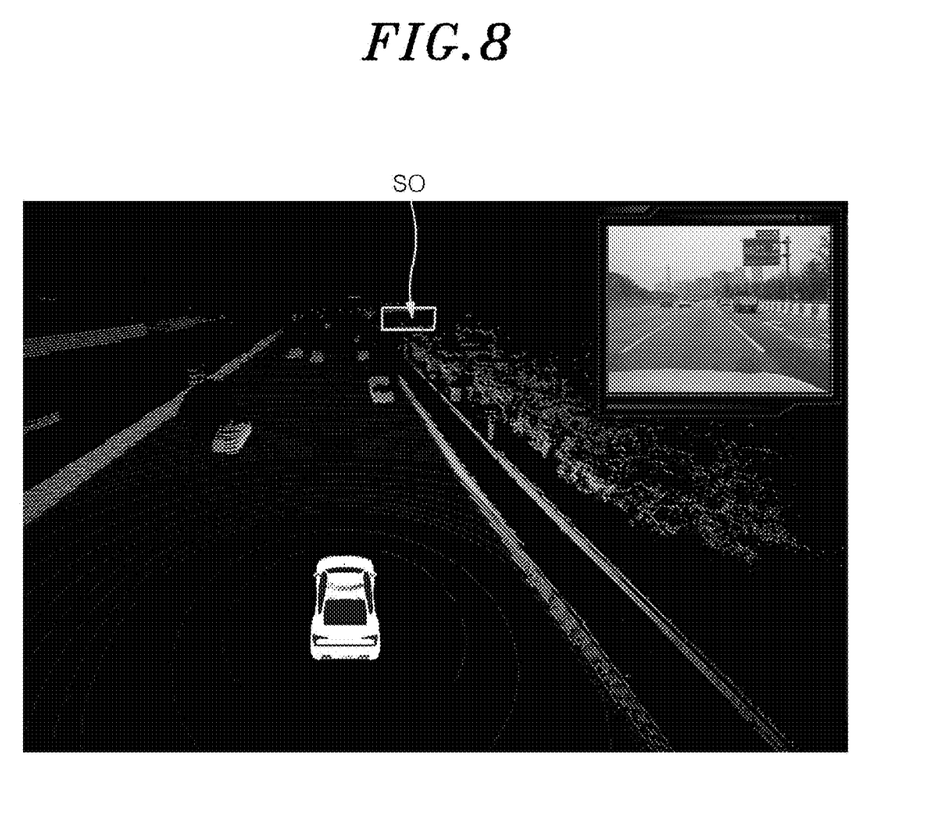
FIG. 8 is an example of a result of determining a traffic sign object by the traffic sign detection unit according to the embodiment of the present disclosure.

For example, FIG. 8 illustrates an example of a result of determining the traffic sign object by the traffic sign detection unit 240 according to the embodiment of the present disclosure.

Referring to FIG. 8, the traffic sign detection unit 240 may detect a traffic sign object corresponding to a traffic sign from at least one plane object based on at least one of a predetermined reference angle, a predetermined reference size, or a predetermined second reference height, and describe a surrounding outline SO of the determined traffic sign object using line fitting.

Finally, for the stabilization of the traffic sign detection, the traffic sign tracking unit 250 may compare a detection result in a present frame with a detection result in a previous frame, and determine the identity of a first traffic sign object detected in the present frame and a second traffic sign object detected in the previous frame.

More specifically, the traffic sign tracking unit 250 may compare the size and the position of the first traffic sign object with the size and the position of the second traffic sign object. For example, as a result of the comparison, in case that the difference of the sizes is within a first range and the difference of the positions is within a second range, the traffic sign tracking unit 250 may determine that the first traffic sign object is the same as the second traffic sign object.

According to the embodiment of the present disclosure, at least one of the first range or the second range may be determined based on the driving speed of the vehicle. That is, at least one of the first range or the second range may be variable.

In case that the first traffic sign object is the same as the second traffic sign object, the traffic sign tracking unit 250 may set an ID of the first traffic sign object to be the same as an ID of the second traffic sign object.

Figure 9:
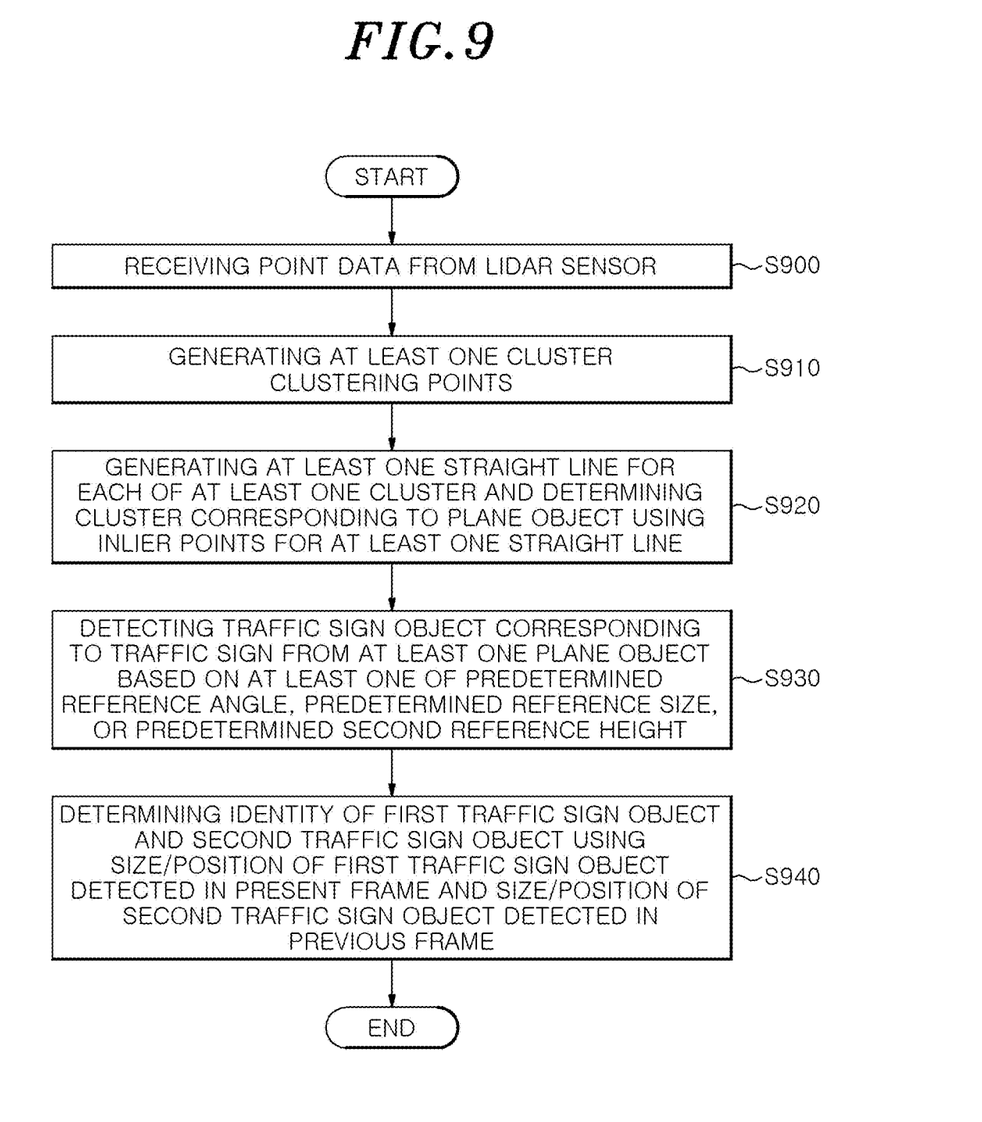
FIG. 9 is a flowchart illustrating a method for detecting the traffic sign by the traffic sign detection device according to the embodiment of the present disclosure.

FIG. 9 is a flowchart illustrating a method for detecting the traffic sign by the traffic sign detection device according to the embodiment of the present disclosure.

Referring to FIG. 1, FIG. 2 and FIG. 9, when the point data receiving unit 210 acquires point data including a plurality of points from the lidar sensor 20 (S900), the point clustering unit 220 clusters the plurality of points to generate at least one cluster (S910).

Then, the plane object determination unit 230 may generate at least one straight line using points included in each of at least one cluster, and determine a cluster corresponding to the plane object from the at least one cluster using inlier points for the at least one straight line (S920).

Further, the traffic sign detection unit 240 may detect the traffic sign object corresponding to the traffic sign from the at least one plane object based on at least one of the predetermined reference angle, the predetermined reference size, or the predetermined second reference height (S930).

Finally, the traffic sign tracking unit 250 may determine the identity of the first traffic sign object and the second traffic sign object using the size and the position of the first traffic sign object detected in the present frame and the size and the position of the second traffic sign object detected in the previous frame (S940).

According to the embodiment of the present disclosure, by detecting the traffic sign using the lidar sensor, it is possible to detect traffic sign on a road despite the changes of the environment such as a considerable change of illuminance, a night or raining situation, and the like.

Further, according to the embodiment of the present disclosure, by accurately providing the longitudinal distance between the traffic sign and the vehicle, it is possible to precisely estimate the position of the vehicle.

Furthermore, according to the embodiment of the present disclosure, by measuring the actual distance between the vehicle and the traffic sign using the lidar sensor, it is possible to accurately measure the 3D position of the traffic sign.

The combinations of respective blocks of block diagrams and respective sequences of a flow diagram attached herein is carried out by computer program instructions which are executed through various computer means and recorded in a non-transitory computer-readable recording medium. Since the computer program instructions is loaded in processors of a general purpose computer, a special purpose computer, or other programmable data processing apparatus, the instructions, carried out by the processor of the computer or other programmable data processing apparatus, create means for performing functions described in the respective blocks of the block diagrams or in the respective sequences of the sequence diagram. Since the computer program instructions, in order to implement functions in specific manner, is stored in a memory unit, which comprises non-transitory computer-readable medium, useable or readable by a computer or a computer aiming for other programmable data processing apparatus, the instruction stored in the memory unit useable or readable by a computer produces manufacturing items including an instruction means for performing functions described in the respective blocks of the block diagrams and in the respective sequences of the sequence diagram. Since the computer program instructions are loaded in a computer or other programmable data processing apparatus, instructions, a series of sequences of which is executed in a computer or other programmable data processing apparatus to create processes executed by a computer to operate a computer or other programmable data processing apparatus, provides operations for executing functions described in the respective blocks of the block diagrams and the respective sequences of the flow diagram. The computer program instructions are also performed by one or more processes or specifically configured hardware (e.g., by one or more application specific integrated circuits or ASIC(s)). The non-transitory computer-readable recording medium includes, for example, a program command, a data file, a data structure and the like solely or in a combined manner. The program command recorded in the medium is a program command specially designed and configured for the present disclosure or a program command known to be used by those skilled in the art of the computer software. The non-transitory computer-readable recording medium includes, for example, magnetic media, such as a hard disk, a floppy disk and a magnetic tape, optical media, such as a CD-ROM and a DVD, magneto-optical media, such as a floptical disk, and hardware devices specially configured to store and execute program commands, such as a ROM, a RAM, a flash memory and the like. The program command includes, for example, high-level language codes that can be executed by a computer using an interpreter or the like, as well as a machine code generated by a compiler. The hardware devices can be configured to operate using one or more software modules in order to perform the operation of the present disclosure, and vice versa. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

Moreover, the respective blocks or the respective sequences in the appended drawings indicate some of modules, segments, or codes including at least one executable instruction for executing a specific logical function(s). In several alternative embodiments, it is noted that the functions described in the blocks or the sequences run out of order. For example, two consecutive blocks and sequences are substantially executed simultaneously or often in reverse order according to corresponding functions.

The explanation as set forth above is merely described a technical idea of the exemplary embodiments of the present disclosure, and it will be understood by those skilled in the art to which this disclosure belongs that various changes and modifications is made without departing from the scope and spirit of the claimed invention as disclosed in the accompanying claims. Therefore, the exemplary embodiments disclosed herein are not used to limit the technical idea of the present disclosure, but to explain the present disclosure. The scope of the claimed invention is to be determined by not only the following claims but also their equivalents. Specific terms used in this disclosure and drawings are used for illustrative purposes and not to be considered as limitations of the present disclosure. Therefore, the scope of the claimed invention is construed as defined in the following claims and changes, modifications and equivalents that fall within the technical idea of the present disclosure are intended to be embraced by the scope of the claimed invention.

What is claimed is:

1. A method for detecting a traffic sign using a traffic sign detection device, the method comprising:
    acquiring point data from a lidar sensor by detecting a vicinity of the lidar sensor;
    clustering a plurality of points based on positions of the plurality of points included in the point data;
    determining one or more plane object clusters, each of which corresponds to a plane object, among one or more clusters, each of which is formed by clustering the plurality of points; and
    detecting one or more traffic sign object clusters, each of which corresponds to the traffic sign, among the one or more plane object clusters based on a predetermined traffic sign detection factor, wherein the determining of the one or more plane object clusters comprises:
        generating one or more straight lines each connecting at least one pair of points included in a first cluster of the one or more clusters; and
        determining whether the first cluster belongs to the one or more plane object clusters by using inlier points for each of the one or more straight lines,
    wherein the determining of whether the first cluster belongs to the one or more plane object clusters comprises:
        selecting a representative straight line having the most inlier points from among the one or more straight lines; and
        determining that the first cluster belongs to the one or more plane object clusters when a ratio of a total number of inlier points for the representative straight line to a total number of points included in the first cluster is equal to or greater than a predetermined reference ratio.

2. The method of claim 1, wherein the clustering of the plurality of points comprises:
    distinguishing traffic sign candidate points having heights equal to or greater than a predetermined first reference height among the plurality of points; and
    clustering the traffic sign candidate points based on positions of the traffic sign candidate points.

3. The method of claim 2, wherein the clustering of the traffic sign candidate points comprises:
    connecting, among the traffic sign candidate points, traffic sign candidate points having a distance therebetween that is equal to or smaller than a predetermined first reference distance; and
    clustering the traffic sign candidate points such that the connected traffic sign candidate points are included in one cluster.

4. The method of claim 1, wherein the predetermined traffic sign detection factor includes at least one of a reference angle, a reference size, or a second reference height.

5. The method of claim 4, wherein the detecting of the one or more traffic sign object clusters comprises:
    when the predetermined traffic sign detection factor includes the reference angle, determining whether an angle difference between a normal vector of the plane object indicated by each of the one or more plane object clusters and a moving direction of a vehicle having the traffic sign detection device is equal to or smaller than the reference angle.

6. The method of claim 4, wherein the detecting of the one or more traffic sign object clusters comprises:
    when the predetermined traffic sign detection factor includes the reference size, determining whether a size of the plane object indicated by each of the one or more plane object cluster is equal to or greater than the reference size.

7. The method of claim 4, wherein the detecting of the one or more traffic sign object clusters comprises:
    when the predetermined traffic sign detection factor includes the second reference height, determining that a height of the plane object indicated by each of the one or more plane object clusters from a ground surface is equal to or greater than the second reference height.

8. The method of claim 1, wherein the predetermined traffic sign detection factor includes at least one of a reference size or a second reference height, and
    the detecting of the one or more traffic sign object clusters comprises:
    dividing each of the one or more plane object clusters into a plurality of areas according to predetermined intervals;
    selecting one or more traffic sign detecting areas among the plurality of areas based on a horizontal distance between a first point having a largest horizontal position value and a second point having a smallest horizontal position value among points included in each of the plurality of areas; and
    determining whether the corresponding plane object cluster satisfies at least one of the reference size or the second reference height included in the predetermined traffic sign detection factor by using positions of points included in the selected one or more traffic sign detecting areas.

9. The method of claim 8, when the predetermined traffic sign detection factor includes the reference size, the determining of whether the corresponding plane object cluster satisfies at least one of the reference size or the second reference height comprises:
　　determining a third point having the smallest horizontal position value, a fourth point having the largest horizontal position value, a fifth point having the smallest vertical position value and a sixth point having the largest vertical position value among the points included in the selected one or more traffic sign detecting areas; and
　　determining whether the corresponding plane object cluster satisfies the reference size based on a difference between the horizontal position value of the third point and the horizontal position value of the fourth point and a difference between the vertical position value of the fifth point and the vertical position value of the sixth point.

10. The method of claim 8, wherein when the predetermined traffic sign detection factor includes the second reference height, the determining of whether the corresponding plane object cluster satisfies at least one of the reference size or the second reference height comprises:
　　determining a seventh point having the smallest vertical position value among the points included in the selected one or more traffic sign detecting areas; and
　　determining whether the corresponding plane object cluster satisfies the second reference height based on the vertical position value of the seventh point.

11. The method of claim 1, wherein the acquiring of the point data, the clustering of the plurality of points, the determining of the one or more plane object clusters, and the detecting of the one or more traffic sign object clusters are performed frame by frame, and
　　the method further comprises:
　　based on at least one comparison result of a size and a position of a first traffic sign object indicated by a first traffic sign object cluster detected in a present frame and a size and a position of a second traffic sign object indicated by a second traffic sign object cluster detected in a previous frame, determining an identity of the first traffic sign object and the second traffic sign object.

12. A traffic sign detection system comprising:
　　a lidar sensor configured to acquire point data by detecting a vicinity of the lidar sensor; and
　　a traffic sign detection device configured to acquire a traffic sign,
　　wherein the traffic sign detection device comprises:
　　a transceiver configured to acquire the point data detected by the lidar sensor; and
　　a processor configured to control the transceiver,
　　wherein the processor is configured to:
　　cluster a plurality of points based on positions of the plurality of points included in the point data;
　　determine one or more plane object clusters, each of which corresponds to a plane object, among one or more clusters, each of which is formed by clustering the plurality of points by generating one or more straight lines each connecting at least one pair of points included in a first cluster of the one or more clusters and determining whether the first cluster belongs to the one or more plane object clusters by using inlier points for each of the one or more straight lines, wherein the determining of whether the first cluster belongs to the one or more plane object clusters comprises selecting a representative straight line having the most inlier points from among the one or more straight lines and determining that the first cluster belongs to the one or more plane object clusters when a ratio of a total number of inlier points for the representative straight line to a total number of points included in the first cluster is equal to or greater than a predetermined reference ratio; and
　　detect one or more traffic sign object clusters, each of which corresponds to the traffic sign, among the one or more plane object clusters based on a predetermined traffic sign detection factor.

13. A non-transitory computer-readable storage medium storing computer-executable instructions which cause, when executed by a processor, the processor to perform a method for detecting a traffic sign using a traffic sign detection device, the method comprising:
　　acquiring point data from a lidar sensor detecting a vicinity of the lidar sensor;
　　clustering a plurality of points based on positions of the plurality of points included in the point data;
　　determining one or more plane object clusters, each of which corresponds to a plane object, among one or more clusters, each of which is formed by clustering the plurality of points; and
　　detecting one or more traffic sign object clusters, each of which corresponds to the traffic sign, among the one or more plane object clusters based on a predetermined traffic sign detection factor, wherein the determining of the one or more plane object clusters comprises:
　　　　generating one or more straight lines each connecting at least one pair of points included in a first cluster of the one or more clusters; and
　　　　determining whether the first cluster belongs to the one or more plane object clusters by using inlier points for each of the one or more straight lines, wherein the determining of whether the first cluster belongs to the one or more plane object clusters comprises:
　　　　　　selecting a representative straight line having the most inlier points from among the one or more straight lines; and
　　　　　　determining that the first cluster belongs to the one or more plane object clusters when a ratio of a total number of inlier points for the representative straight line to a total number of points included in the first cluster is equal to or greater than a predetermined reference ratio.

14. The non-transitory computer-readable storage medium of claim 13, wherein the clustering of the plurality of points comprises:
　　distinguishing traffic sign candidate points having heights equal to or greater than a predetermined first reference height among the plurality of points; and
　　clustering the traffic sign candidate points based on positions of the traffic sign candidate points.

15. The non-transitory computer-readable storage medium of claim 14, wherein the clustering of the traffic sign candidate points comprises:
　　connecting, among the traffic sign candidate points, traffic sign candidate points having a distance therebetween that is equal to or smaller than a predetermined first reference distance; and
　　clustering the traffic sign candidate points such that the connected traffic sign candidate points are included in one cluster.

16. The non-transitory computer-readable storage medium of claim 13, wherein the predetermined traffic sign detection factor includes at least one of a reference angle, a reference size, or a second reference height.

* * * * *